United States Patent
Hariu et al.

(10) Patent No.: US 11,840,598 B2
(45) Date of Patent: Dec. 12, 2023

(54) URETHANE RESIN

(71) Applicant: MITSUBISHI GAS CHEMICAL COMPANY, INC., Chiyoda-ku (JP)

(72) Inventors: Tomohiro Hariu, Kanagawa (JP); Yosuke Ota, Okayama (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 22 days.

(21) Appl. No.: 17/637,739

(22) PCT Filed: Aug. 26, 2020

(86) PCT No.: PCT/JP2020/032146
§ 371 (c)(1),
(2) Date: Feb. 23, 2022

(87) PCT Pub. No.: WO2021/039832
PCT Pub. Date: Mar. 4, 2021

(65) Prior Publication Data
US 2022/0282023 A1    Sep. 8, 2022

(30) Foreign Application Priority Data

Aug. 27, 2019    (JP) .................................. 2019-154975

(51) Int. Cl.
| C08G 18/08 | (2006.01) |
| C08G 18/32 | (2006.01) |
| C08G 18/10 | (2006.01) |
| C08G 18/42 | (2006.01) |

(52) U.S. Cl.
CPC ..... C08G 18/3209 (2013.01); C08G 18/0847 (2013.01); C08G 18/10 (2013.01); C08G 18/4238 (2013.01); C08G 2150/00 (2013.01); C08G 2170/20 (2013.01)

(58) Field of Classification Search
CPC ............ C08G 18/3209; C08G 18/3215; C08G 18/10; C08G 18/0847; C08G 18/4238
See application file for complete search history.

(56) References Cited

U.S. PATENT DOCUMENTS

| 3,140,273 A | * | 7/1964 | Theis ................. C08G 18/4879 |
| | | | 528/48 |
| 4,320,208 A | | 3/1982 | Reischl et al. |
| 2003/0106804 A1 | | 6/2003 | Nishiguchi et al. |
| 2005/0199778 A1 | | 9/2005 | Kadowaki et al. |
| 2008/0287612 A1 | | 11/2008 | Nishiguchi et al. |
| 2012/0041141 A1 | | 2/2012 | Otomo et al. |

FOREIGN PATENT DOCUMENTS

| CN | 1754928 A | 4/2006 |
| CN | 101307200 A | 11/2008 |
| CN | 101928505 A | 12/2010 |
| CN | 102414240 A | 4/2012 |
| CN | 5065471 B2 | 10/2012 |
| CN | 105518091 A | 4/2016 |
| CN | 107254049 A | 10/2017 |
| CN | 109071955 A | 12/2018 |
| JP | 53-54298 A | 5/1978 |
| JP | 55-155014 A | 12/1980 |
| JP | 57-182313 A | 11/1982 |
| JP | 5-65471 A | 3/1993 |
| JP | 06049975 A * | 2/1994 |
| JP | 10-60261 A | 3/1998 |
| JP | 11-293221 A | 10/1999 |
| JP | 2001-164228 A | 6/2001 |
| JP | 2001-279214 A | 10/2001 |
| JP | 2001279214 A * | 10/2001 |
| JP | 3326534 B2 | 9/2002 |
| JP | 2013-108000 A | 6/2013 |
| JP | 2017-197628 A | 11/2017 |

OTHER PUBLICATIONS

JP-2001279214-A_10-2001_English Translation.*
JP-06049975-A_02-1994_English Translation.*
International Search Report dated Nov. 17, 2020 in PCT/JP2020/032146 filed on Aug. 26, 2020. (3 pages)
Yue et al., "Study on preparation and properties of crosslinked anionic waterborne polyurethane", Functional Materials, vol. 42, Issue 10, Oct. 31, 2011, pp. 1795-1798 (with English Abstract).

\* cited by examiner

*Primary Examiner* — Michael L Leonard
(74) *Attorney, Agent, or Firm* — Oblon, McClelland, Maier & Neustadt, L.L.P.

(57) ABSTRACT

There is provided a urethane resin that is excellent in adhesive strength, and maintains high adhesive strength even after exposure to high temperature and humidity. A urethane resin obtained by reacting a glycol-modified aromatic hydrocarbon-formaldehyde resin (A) modified with a glycol with a polyisocyanate (B) having two or more free isocyanate groups in a molecule.

13 Claims, No Drawings

URETHANE RESIN

CROSS-REFERENCE TO RELATED APPLICATIONS

The present application is a 35 U.S.C. § 371 national stage application of International patent application PCT/JP2020/032146, filed Aug. 26, 2020, which is based on and claims the benefit of priority to Japanese Application No. 2019-154975, filed Aug. 27, 2019. The entire contents of these applications are incorporated herein by reference.

TECHNICAL FIELD

The present invention relates to a urethane resin.

BACKGROUND ART

In the applications of protective coating materials for the prevention of the abrasion and contamination of the surfaces of various types of base materials, adhesives for various types of base materials, sealing materials, and antireflection films for film type liquid crystal devices, touch panels, plastic optical components, and the like, various types of urethane resins are proposed as curable compositions that can form a cured film excellent in hardness, flexibility, abrasion resistance, wear resistance, low curling properties, high refractive index, close contact, and transparency.

Urethane-based resins obtained by reacting polyisocyanates with polyols are widely used for packaging materials, and sealing agents for various types of electrical components, because of their high adhesiveness. It is reported that a urethane resin using a castor oil-based polyol as a starting material is relatively inexpensive and excellent in versatility and has high insulating properties and is therefore useful as a sealing material for electrical components (PTL 1).

CITATION LIST

Patent Literature

PTL 1: JP 2017-197628 A

SUMMARY OF INVENTION

Technical Problem

However, the suppression of a decrease in the physical properties of a urethane resin in a high temperature and humidity environment assumed during use as the sealing agent is not yet sufficient. In view of such circumstances, it is an object of the present invention to provide a urethane resin that is excellent in adhesive strength, and maintains high adhesive strength even after exposure to high temperature and humidity.

Solution to Problem

The present inventors have studied diligently and as a result found that a urethane resin obtained by reacting an aromatic hydrocarbon-formaldehyde resin modified with a glycol with a polyisocyanate solves the problem. Specifically, the present invention is as follows.

[1] A urethane resin obtained by reacting a glycol-modified aromatic hydrocarbon-formaldehyde resin (A) modified with a glycol with a polyisocyanate (B) having two or more free isocyanate groups in a molecule.

[2] The urethane resin according to the [1], wherein a hydroxyl value of the glycol-modified aromatic hydrocarbon-formaldehyde resin (A) is 50 to 250 mg KOH/g.

[3] The urethane resin according to the [1] or [2], wherein the glycol-modified aromatic hydrocarbon-formaldehyde resin (A) is obtained by reacting 100 parts by mass of an aromatic hydrocarbon-formaldehyde resin with 10 to 100 parts of the glycol.

[4] The urethane resin according to any one of the [1] to [3], wherein a weight average molecular weight of the glycol-modified aromatic hydrocarbon-formaldehyde resin (A) is 250 to 5,000 in terms of polystyrene.

[5] The urethane resin according to any one of the [1] to [4], wherein the glycol is at least one selected from the group consisting of neopentyl glycol, a spiroglycol, ethylene glycol, diethylene glycol, dipropylene glycol, 1,2-butanediol, 1,3-butanediol, 1,4-butanediol, 1,5-pentanediol, 1,6-hexanediol, 2,5-hexanediol, 1,2-hexanediol, 1,2-octanediol, 1,10-decanediol, 3-hexyne-2,5-diol, 2,5-dimethyl-3-hexyne-2,5-diol, 2,2,4-trimethyl-1,3-pentanediol, polyethylene glycol, and polyoxypropylene glycol.

[6] The urethane resin according to any one of the [1] to [5], wherein the glycol-modified aromatic hydrocarbon-formaldehyde resin (A) is an ethylene glycol-modified xylene-formaldehyde resin.

[7] The urethane resin according to any one of the [1] to [6], obtained by reacting the glycol-modified aromatic hydrocarbon-formaldehyde resin (A), the polyisocyanate (B), and further a polyol (C).

[8] The urethane resin according to any one of the [1] to [7], obtained by reacting the glycol-modified aromatic hydrocarbon-formaldehyde resin (A), the polyisocyanate (B), and the polyol (C) at a molar ratio of isocyanate groups (NCO) of the polyisocyanate (B) and total hydroxy groups ($OH^T$) of hydroxy groups of the glycol-modified aromatic hydrocarbon-formaldehyde resin (A) and hydroxy groups of the polyol (C) (NCO/$OH^T$) in a range of 1.0 to 4.0. [9] The urethane resin according to any one of the [1] to [8], wherein the polyisocyanate (B) is an aromatic group-containing polyisocyanate.

[10] The urethane resin according to any one of the [1] to [8], wherein the polyisocyanate (B) is an aliphatic polyisocyanate containing no aromatic group.

[11] The urethane resin according to any one of the [1] to [10], obtained using 1 to 50% by mass of the glycol-modified aromatic hydrocarbon-formaldehyde resin (A) in 100% by mass of a total of starting materials of the urethane resin.

[12] The urethane resin according to any one of [1] to [11], wherein the reaction of the glycol-modified aromatic hydrocarbon-formaldehyde resin (A) with the polyisocyanate (B) is performed in a water solvent.

[13] An adhesive including the urethane resin according to any one of the [1] to [12].

[14] A paint including the urethane resin according to any one of the [1] to [12].

Advantageous Effects of Invention

According to the present invention, it is possible to provide a urethane resin that is excellent in adhesive strength, and maintains high adhesive strength even after exposure to high temperature and humidity.

DESCRIPTION OF EMBODIMENTS

A mode for carrying out the present invention (hereinafter simply referred to as "this embodiment") will be described in detail below. This embodiment below is an illustration for describing the present invention, and the present invention is not limited to the following contents. Appropriate modifications can be made to the present invention without departing from the spirit thereof. As used herein, definitions considered preferred can be optionally adopted, and it can be said that combinations of the preferred are more preferred. As used herein, the description "XX to YY" means "XX or more and YY or less".

[Glycol-Modified Aromatic Hydrocarbon-Formaldehyde Resin (A)]

In this embodiment, a glycol-modified aromatic hydrocarbon-formaldehyde resin (A) is an aromatic hydrocarbon-formaldehyde resin modified with a glycol.

<Aromatic Hydrocarbon-Formaldehyde Resin>

The aromatic hydrocarbon-formaldehyde resin is obtained by reacting an aromatic hydrocarbon with formaldehyde. Examples of the aromatic hydrocarbon include at least one selected from the group consisting of benzene, toluene, xylene, mesitylene, ethylbenzene, propylbenzene, decylbenzene, cyclohexylbenzene, biphenyl, methylbiphenyl, naphthalene, methylnaphthalene, dimethylnaphthalene, ethylnaphthalene, anthracene, methylanthracene, dimethylanthracene, ethylanthracene, and binaphthyl. From the viewpoints of better adhesiveness and moist heat resistance, the aromatic hydrocarbon is preferably at least one selected from the group consisting of xylene, toluene, and mesitylene, more preferably xylene, and particularly preferably meta-xylene. From the same viewpoint as above, the aromatic hydrocarbon-formaldehyde resin of this embodiment preferably includes at least one selected from the group consisting of a xylene-formaldehyde resin obtained by reacting xylene with formaldehyde, a toluene-formaldehyde resin obtained by reacting toluene with formaldehyde, and a mesitylene-formaldehyde resin obtained by reacting mesitylene with formaldehyde, more preferably a xylene-formaldehyde resin.

For the aromatic hydrocarbon-formaldehyde resin, a commercial product may be used, or the aromatic hydrocarbon-formaldehyde resin may be prepared by a known method. Examples of the commercial product include "NIKANOL G" and "NIKANOL Y-100" manufactured by Fudow Company Limited. Examples of the known method include a method of subjecting an aromatic hydrocarbon and formaldehyde to a condensation reaction in the presence of a catalyst by the method described in JP 37-5747 B or the like.

<Glycol>

The glycol is not particularly limited, and an alkanediol preferably having 2 to 20 carbon atoms, more preferably 2 to 10 carbon atoms, can be used. When the number of carbon atoms of the alkanediol used is too large, the aromatic hydrocarbon-formaldehyde resin segments decrease relatively, and good heat resistance cannot be maintained. The alkyl moiety of the glycol may be linear or branched. Especially, the glycol is preferably at least one selected from the group consisting of neopentyl glycol, a spiroglycol (for example, 3,9-bis(2-hydroxy-1,1-dimethylethyl)-2,4,8,10-tetraoxaspiro[5.5]undecane), ethylene glycol, diethylene glycol, dipropylene glycol, 1,2-butanediol, 1,3-butanediol, 1,4-butanediol, 1,5-pentanediol, 1,6-hexanediol, 2,5-hexanediol, 1,2-hexanediol, 1,2-octanediol, 1,10-decanediol, 3-hexyne-2,5-diol, 2,5-dimethyl-3-hexyne-2,5-diol, 2,2,4-trimethyl-1,3-pentanediol, polyethylene glycol, and polyoxypropylene glycol, more preferably ethylene glycol, from the viewpoints of easy availability and reactivity.

From the viewpoint of adhesiveness, the glycol-modified aromatic hydrocarbon-formaldehyde resin preferably includes at least one selected from the group consisting of a glycol-modified xylene-formaldehyde resin, a glycol-modified toluene-formaldehyde resin, and a glycol-modified mesitylene-formaldehyde resin, more preferably a glycol-modified xylene-formaldehyde resin. Especially, the glycol-modified aromatic hydrocarbon-formaldehyde resin preferably includes an ethylene glycol-modified xylene-formaldehyde resin. By using the glycol-modified aromatic hydrocarbon-formaldehyde resin, excellent adhesiveness can be maintained even after exposure to high temperature and humidity.

The glycol-modified aromatic hydrocarbon-formaldehyde resin of this embodiment can be produced by a known method. As the known method, for example, the glycol-modified aromatic hydrocarbon-formaldehyde resin can be produced by subjecting an aromatic hydrocarbon-formaldehyde resin and a glycol to a condensation reaction in the presence of an acidic catalyst as described in JP 04-224815 A. In the reaction, 10 to 100 parts by mass of the glycol is preferably reacted with 100 parts by mass of the aromatic hydrocarbon-formaldehyde resin. When the amount of the glycol based on 100 parts by mass of the aromatic hydrocarbon-formaldehyde resin is in the range, a glycol-modified aromatic hydrocarbon-formaldehyde resin excellent in adhesiveness can be obtained without impairing the properties of the aromatic hydrocarbon-formaldehyde resin such as close contact and flexibility.

More preferably 10 to 80 parts by mass, further preferably 20 to 70 parts by mass, of the glycol can be reacted with 100 parts by mass of the aromatic hydrocarbon-formaldehyde resin.

In the glycol-modified aromatic hydrocarbon-formaldehyde resin of this embodiment, an aromatic hydrocarbon-formaldehyde resin, whose structure is difficult to identify by analysis, is used as a starting material, and therefore the structure of the glycol-modified aromatic hydrocarbon-formaldehyde resin modified with the glycol is also difficult to analyze and identify.

Further, the glycol-modified aromatic hydrocarbon-formaldehyde resin (A) of the present invention may be produced by modifying an aromatic hydrocarbon-formaldehyde resin with maleic anhydride and then with the glycol.

When the aromatic hydrocarbon-formaldehyde resin is modified with maleic anhydride, the amount of maleic anhydride is preferably 0.1 to 10.0 parts by mass, more preferably 0.5 to 5.0 parts by mass, based on 100 parts by mass of the aromatic hydrocarbon-formaldehyde resin.

<Physical Properties of Glycol-Modified Aromatic Hydrocarbon-Formaldehyde Resin>

The hydroxyl value (OH value) of the glycol-modified aromatic hydrocarbon-formaldehyde resin (A) is preferably 50 to 250 mg KOH/g, more preferably 80 to 200 mg KOH/g, and further preferably 100 to 180 mg KOH/g. When the hydroxyl value is in the range, the close contact and flexibility derived from the aromatic hydrocarbon-formaldehyde resin can be provided to an obtained urethane resin while the characteristics (adhesiveness and the like) of the urethane resin are ensured. The hydroxyl value can be measured by a method in accordance with the acetic anhydride-pyridine method (JIS K 1557-1: 2007).

The weight average molecular weight (Mw) of the glycol-modified aromatic hydrocarbon-formaldehyde resin of this embodiment measured by gel permeation chromatography (GPC) is preferably 250 to 5,000, more preferably 300 to 2,000, in terms of polystyrene. When the weight average molecular weight is in the range, a urethane resin excellent in adhesiveness and also excellent in flexibility and close contact can be obtained.

The glycol-modified aromatic hydrocarbon-formaldehyde resin (A) may have a glycol-modified group at both ends or one end thereof, which is not particularly limited as long as the glycol-modified aromatic hydrocarbon-formaldehyde resin (A) has the above features.

[Polyisocyanate (B)]

The polyisocyanate (B) in this embodiment has two or more free isocyanate groups in the molecule. The polyisocyanate (B) may be an aromatic polyisocyanate or an aliphatic polyisocyanate.

The aromatic polyisocyanate refers to an isocyanate compound in which two or more free isocyanate groups present in the molecule are directly bonded to an aromatic ring, and is not particularly limited as long as the requirement is satisfied. Examples of such an aromatic polyisocyanate can include diisocyanate compounds having two free isocyanate groups and an aromatic ring in the molecule. Examples of specific aromatic diisocyanates can include at least one selected from the group consisting of 2,4-tolylene diisocyanate, 2,6-tolylene diisocyanate, diphenylmethane diisocyanate, naphthene diisocyanate, tolylene diisocyanate, tolidine diisocyanate, diphenylmethylmethane diisocyanate, tetraalkyldiphenylmethane diisocyanates, dibenzyl diisocyanate, and phenylene diisocyanate. Especially, as the aromatic polyisocyanate, at least one aromatic diisocyanate selected from the group consisting of diphenylmethane diisocyanate and tolylene diisocyanate is more preferably used.

The aliphatic polyisocyanate refers to an isocyanate compound in which two or more free isocyanate groups present in the molecule are directly bonded to an aliphatic group, and is not particularly limited as long as the requirement is satisfied. The aliphatic polyisocyanates include even isocyanate compounds having an aromatic group in the molecule when the aromatic group is bonded to an isocyanate group via an aliphatic group, unlike the aromatic diisocyanates. Examples of such an aliphatic polyisocyanate can include diisocyanate compounds having two free isocyanate groups and an aliphatic group in the molecule. Examples of specific aliphatic diisocyanates can include aliphatic diisocyanates containing no aromatic group in the molecule, such as methylene diisocyanate, propylene diisocyanate, lysine diisocyanate, trimethylhexamethylene diisocyanate, and hexamethylene diisocyanate; alicyclic diisocyanates containing no aromatic group in the molecule, such as cyclohexane diisocyanate, methylcyclohexane diisocyanate, isophorone diisocyanate, dicyclohexylmethane diisocyanate, and isopropylidenedicyclohexyl diisocyanate; and aliphatic diisocyanates containing an aromatic group in the molecule, such as xylylene diisocyanate and α,α,α',α'-tetramethylxylylene diisocyanate. Especially, as the aliphatic polyisocyanate, at least one aliphatic polyisocyanate selected from the group consisting of hexamethylene diisocyanate and xylylene diisocyanate is more preferably used, and for xylylene diisocyanate, meta-xylylene diisocyanate is particularly preferred.

The polyisocyanate having two or more free isocyanate groups in the molecule is not particularly limited, and either of an aromatic polyisocyanate and an aliphatic polyisocyanate can be preferably used. Especially, a polyisocyanate selected from the group consisting of a polyisocyanate having an aromatic ring in the polyisocyanate molecule, that is, an aromatic polyisocyanate, and an aliphatic polyisocyanate in which an aromatic group is bonded to an isocyanate group via an aliphatic group can be preferably used from the viewpoint of heat resistance. As used herein, these isocyanates having an aromatic ring in the molecule are collectively referred to as "aromatic group-containing polyisocyanates". That is, an aromatic polyisocyanate necessarily corresponds to an "aromatic group-containing polyisocyanate", and an aliphatic polyisocyanate also corresponds to an "aromatic group-containing polyisocyanate" when it has an aromatic ring in the molecule.

For the polyisocyanate (B) of this application, the polyisocyanate may be used, or an adduct-modified product of the polyisocyanate may be used.

The urethane resin of this embodiment is obtained by reacting the glycol-modified aromatic hydrocarbon-formaldehyde resin (A) with the polyisocyanate (B) having two or more free isocyanate groups in the molecule and can also be obtained by further reacting a polyol (C). The concept of the polyol (C) includes the glycol and trihydric or higher polyhydric alcohols.

[Polyol (C)]

The polyol is not particularly limited, but an aliphatic polyol and/or a polyester polyol are preferred. Examples of the aliphatic polyol can include trimethylolpropane, neopentyl glycol, ester glycols, spiroglycols, pentaerythritol, ethylene glycol, diethylene glycol, dipropylene glycol, 1,2-butanediol, 1,3-butanediol, 1,4-butanediol, 1,5-pentanediol, 1,6-hexanediol, 2,5-hexanediol, 1,2-hexanediol, trimethylolethane, 1,2-octanediol, 1,10-decanediol, 3-hexyne-2,5-diol, 2,5-dimethyl-3-hexyne-2,5-diol, 2,2,4-trimethyl-1,3-pentanediol, polyoxypropylene triol, polyethylene glycol, polypropylene glycol, and polycarbonate diols. Examples of the polyester polyol can include those obtained from the reaction of polyvalent carboxylic acids (malonic acid, succinic acid, glutaric acid, adipic acid, pimelic acid, suberic acid, sebacic acid, fumaric acid, maleic acid, phthalic acid, terephthalic acid, isophthalic acid, and the like) or acid anhydrides thereof with the aliphatic polyols. Among these, polyester polyols obtained by reacting polyethylene glycol, polypropylene glycol, and/or maleic anhydride and/or phthalic anhydride with ethylene glycol, propylene glycol, polyethylene glycol, or polypropylene glycol are more preferred. One of these polyols (C) can be used alone, or two or more of these polyols (C) can be used in combination. The amount of the polyol (C) is not particularly limited, but the polyol (C) is preferably added so as to satisfy the following molar ratio ($NCO/OH^T$).

The urethane resin of this embodiment is preferably obtained by reacting the components at a molar ratio of the isocyanate groups (NCO) of the polyisocyanate (B) and the total hydroxy groups ($OH^T$) of the hydroxy groups of the glycol-modified aromatic hydrocarbon-formaldehyde resin (A) and the hydroxy groups of the polyol (C) ($NCO/OH^T$) in the range of 1.0 to 4.0. When the molar ratio ($NCO/OH^T$) is in the range, a urethane resin excellent in adhesiveness and excellent in moist heat resistance can be obtained. When the molar ratio ($NCO/OH^T$) is 1.0 or more, a decrease in moist heat resistance due to the remaining polyol component can be suppressed. When the molar ratio ($NCO/OH^T$) is 4.0 or less, defects (foaming and the like) in an adhesive layer can be suppressed, and therefore the heat resistance can be maintained. The molar ratio ($NCO/OH^T$) is more preferably in the range of 1.0 to 3.5, further preferably in the range of 1.0 to 3.0.

[Method for Producing Urethane Resin]

The urethane resin in this embodiment can be produced by reacting the glycol-modified aromatic hydrocarbon-formaldehyde resin (A), the polyisocyanate compound (B), and optionally the polyol (C). In the urethane formation reaction, the order in which these components (A) and (B) and the optional component (C) are reacted, and the like are not particularly limited and can be arbitrarily determined. For example, it is possible to previously mix and react the component (B) and the component (C) and then react the component (A).

The reactions are all the reactions of the hydroxy groups with the isocyanate groups and can be continuously performed usually in the temperature range of 10 to 100° C., preferably 40 to 80° C., for about 1 min to 20 h using a general urethane formation catalyst such as dibutyltin dilaurate or dibutyltin diethylhexoate.

The "urethane resin" herein encompasses polymers obtained by the progress of a reaction by reacting the glycol-modified aromatic hydrocarbon-formaldehyde resin (A), the polyisocyanate compound (B), and optionally the polyol (C), and the degree of polymerization does not matter. For example, the "urethane resin" also includes urethane prepolymers having a terminal isocyanate group.

The method for producing the urethane resin of this embodiment is not particularly limited. Examples of the method include a method of sequentially blending the components in a solvent and sufficiently stirring a blend. In addition, for example, it is possible to mix and react the components in the absence of a solvent and then dissolve, emulsify, or disperse an obtained urethane resin in a solvent. In the production of the urethane resin, 1 to 50% by mass of the glycol-modified aromatic hydrocarbon-formaldehyde resin (A) is preferably used in 100% by mass of the total of the starting materials of the urethane resin. When the glycol-modified aromatic hydrocarbon-formaldehyde resin (A) is used in the range, the close contact and flexibility derived from the resin (A) can be sufficiently provided to the urethane resin.

During the production of the urethane resin, known treatment (stirring, mixing, or kneading treatment or the like) for uniformly dissolving, emulsifying, or dispersing the components can be performed as needed. The stirring, mixing, or kneading treatment can be appropriately performed using a known apparatus, for example, a stirring apparatus intended for dispersion, such as an ultrasonic homogenizer, an apparatus intended for mixing, such as a three-roll mill, a ball mill, a bead mill, or a sand mill, or a revolution or rotation type mixing apparatus.

During the preparation of the urethane resin of this embodiment, a solvent can be used as needed. The type of the solvent is not particularly limited as long as the resin in a composition can be dissolved, emulsified, or dispersed. An organic solvent, water, and the like can be used.

The organic solvent is not particularly limited, and examples thereof include ketones such as acetone, methyl ethyl ketone, and methyl cellosolve; aromatic hydrocarbons such as toluene and xylene; amides such as dimethylformamide; and propylene glycol monomethyl ether and its acetate. One of these organic solvents can be used alone, or two or more of these organic solvents can be appropriately mixed and used.

Examples of the water include ion-exchanged water, distilled water, purified water, tap water, and industrial water.

One of these solvents can be used alone, or two or more of these solvents can be appropriately mixed and used.

[Urethane Resin Composition]

Other components such as known additives can be blended into the urethane resin of this embodiment as desired, to obtain a urethane resin composition including the urethane resin of this embodiment. Examples of other components can include resins such as (meth)acrylate resins, epoxy resins, cyanate compounds, phenolic resins, oxetane resins, and benzoxazine resins, oligomers, various polymer compounds such as elastomers, monomers having a polymerizable functional group, such as compounds having an ethylenic unsaturated group, maleimide compounds, fillers, flame retardants, silane coupling agents, wetting and dispersing agents, photopolymerization initiators, photocuring initiators, thermal curing accelerators, and various types of additives. The components included in the urethane resin composition of this embodiment are not particularly limited as long as they are generally used.

Examples of the various types of additives include ultraviolet absorbents, antioxidants, fluorescent brightening agents, photosensitizers, dyes, pigments, thickening agents, lubricants, antifoaming agents, leveling agents, surface conditioners, brighteners, and polymerization inhibitors.

For other components, one can be used alone, or two or more can be appropriately mixed and used. The amounts of the components blended can also be variously prepared according to the application.

[Applications]

The urethane resin of this embodiment is excellent in adhesiveness and excellent in close contact and flexibility. Therefore, the urethane resin of this embodiment is suitable for use in adhesives. An adhesion surface is not hardened, and therefore a feeling of a foreign body felt when an adhesion part cures is not produced, and a laminate can be formed using a soft elastic material such as a urethane resin material as an object to be adhered. Urethane resin-based solvent type adhesives can be used, for example, in applications where a cushion layer made of a urethane resin is adhered to form a laminate used for bedding or the like, and applications such as the adhesion of a laminate for the vibration and sound insulation of a vehicle, the adhesion of a laminate for a shoe sole, and sealing materials for electrical components. In addition, the urethane resin of this embodiment is excellent in adhesiveness and also excellent in moisture and water resistance and heat resistance. Thus, the urethane resin of this embodiment can be preferably used, for example, in applications such as adhesion for retort and boiled food packaging.

The urethane resin of this embodiment is excellent in adhesiveness and also has the close contact and flexibility derived from the aromatic hydrocarbon-formaldehyde resin (A) and is therefore also suitable for use, for example, in paints. The urethane resin of this embodiment can also be used for linings for water pipes and coating agents such as floor coating agents.

EXAMPLES

The present invention will be described in more detail below by Examples and Comparative Examples, but the present invention is not limited in any way by these Examples.

The evaluation methods adopted in the present Examples and the Comparative Examples are as follows.

(1) Hydroxyl Value (OH Value, mg KOH/g)

For the glycol-modified aromatic hydrocarbon aldehyde resins, the aromatic hydrocarbon aldehyde resins, and the polyols used in the Examples and the Comparative Examples, the hydroxyl value was measured according to the acetic anhydride-pyridine method (JIS K 1557-1: 2007).

(2) Weight Average Molecular Weight (Mw)

For the glycol-modified aromatic hydrocarbon aldehyde resins used in the Examples and the Comparative Examples, the weight average molecular weight (Mw) in terms of polystyrene was obtained by GPC analysis. The apparatus and conditions used for the analysis are as follows.

Apparatus: "Shodex GPC-101" manufactured by Showa Denko K.K.
Columns: "Shodex LF-804" manufactured by Showa Denko K.K.×3
Solution: tetrahydrofuran
Flow rate: 1.0 mL/min.
Column temperature: 40° C.
Detector: RI (differential refractive index detector)

(3) Adhesiveness Test

An obtained laminated film sample was processed into a 15 mm wide test piece, and the test piece was peeled by the T-peel method according to JIS K 6854-3: 1999 to measure the adhesive strength. The unit of the adhesive strength is N/15 mm. The apparatus and conditions used for the analysis are as follows.

Apparatus: "STROGRAPH VG1E" manufactured by Toyo Seiki Seisaku-sho, Ltd.
Peel rate: 100 mm/min.
Measurement atmosphere: 23° C., 50 RH %

<Production Example 1>: Preparation of Glycol-Modified Aromatic Hydrocarbon-Formaldehyde Resin (A1)

300.0 Parts by mass of NIKANOL G (manufactured by Fudow Company Limited, xylene resin, hydroxyl value: 32 mg KOH/g, weight average molecular weight: 1,170), 6.0 parts by mass of maleic anhydride (manufactured by KANTO CHEMICAL CO., INC.), and 0.3 parts by mass of p-toluenesulfonic acid (manufactured by KANTO CHEMICAL CO., INC.) were charged into a flask equipped with a stirrer, a Snyder fractionating column, and a condenser, and gradually heated so that the temperature of the upper portion of the Snyder fractionating column did not exceed 100° C. A mixture was stirred for 1 h while the temperature in the flask was controlled at 120° C. Subsequently, 110.0 parts by mass of ethylene glycol (manufactured by KANTO CHEMICAL CO., INC.) was charged, and a mixture was stirred and reacted for 2 h while the temperature in the flask was controlled at 130° C. Then, 0.6 parts by mass of triethanolamine (manufactured by KANTO CHEMICAL CO., INC.) was added to stop the reaction to obtain a glycol-modified aromatic hydrocarbon-formaldehyde resin (A1) having a hydroxyl value of 117 mg KOH/g and a weight average molecular weight of 1,160.

<Production Example 2>: Preparation of Glycol-Modified Aromatic Hydrocarbon-Formaldehyde Resin (A2)

450.0 Parts by mass of NIKANOL Y-100 (manufactured by Fudow Company Limited, xylene resin, hydroxyl value: 25 mg KOH/g, weight average molecular weight: 360), 9.0 parts by mass of maleic anhydride (manufactured by KANTO CHEMICAL CO., INC.), and 0.2 parts by mass of p-toluenesulfonic acid (manufactured by KANTO CHEMICAL CO., INC.) were charged into a flask equipped with a stirrer, a Snyder fractionating column, and a condenser, and gradually heated so that the temperature of the upper portion of the Snyder fractionating column did not exceed 100° C. A mixture was stirred for 1 h while the temperature in the flask was controlled at 120° C. Subsequently, 300.0 parts by mass of ethylene glycol (manufactured by KANTO CHEMICAL CO., INC.) was charged, and a mixture was stirred and reacted for 2 h while the temperature in the flask was controlled at 130° C. Then, 0.4 parts by mass of triethanolamine (manufactured by KANTO CHEMICAL CO., INC.) was added to stop the reaction to obtain a glycol-modified aromatic hydrocarbon-formaldehyde resin (A2) having a hydroxyl value of 170 mg KOH/g and a weight average molecular weight of 500.

<Production Example 3>: Synthesis of Polyester Polyol (C1)

924.3 Parts by mass of ethylene glycol (manufactured by KANTO CHEMICAL CO., INC.), 474.2 parts by mass of phthalic anhydride (manufactured by KANTO CHEMICAL CO., INC.), 732.4 parts by mass of maleic anhydride (manufactured by KANTO CHEMICAL CO., INC.), and 0.10 parts by mass of titanium tetraisopropoxide (manufactured by TOKYO CHEMICAL INDUSTRY CO., LTD.) were charged into a flask equipped with a stirrer, a nitrogen gas introducing tube, a Snyder fractionating column, and a condenser, and gradually heated so that the temperature of the upper portion of the Snyder fractionating column did not exceed 100° C. A mixture was stirred for 2 h while the temperature in the flask was controlled at 200° C., to terminate the reaction to obtain a polyester polyol (C1) having a hydroxyl value of 167 mg KOH/g and a theoretical number average molecular weight of 670 as calculated from the hydroxyl value.

<Production Example 4>: Synthesis of Polyester Polyol (C2)

134.9 Parts by mass of ethylene glycol (manufactured by KANTO CHEMICAL CO., INC.) and 148.1 parts by mass of phthalic anhydride (manufactured by KANTO CHEMICAL CO., INC.) were charged into a flask equipped with a stirrer, a nitrogen gas introducing tube, a Snyder fractionating column, and a condenser, and gradually heated so that the temperature of the upper portion of the Snyder fractionating column did not exceed 100° C. A mixture was stirred for 1 h while the temperature in the flask was controlled at 220° C., to terminate the reaction to obtain a polyester polyol (C2) having a hydroxyl value of 432 mg KOH/g and a theoretical number average molecular weight of 260 as calculated from the hydroxyl value.

Production Example 5

252.0 Parts by mass of the polyester polyol (C2) and 730.5 parts by mass of xylylene diisocyanate (B1) (manufactured by TOKYO CHEMICAL INDUSTRY CO., LTD., NCO %=44.7%) were charged into a flask equipped with a stirrer, a nitrogen gas introducing tube, a Snyder fractionating column, and a condenser, and reacted for 3 h while the temperature in the flask was controlled at 60° C., to obtain an isocyanate-terminated compound "PEP-XDI" (NCO %=27.9%) formed by reacting (B1) with (C2).

<Production Example 6>: Synthesis of Polyester Polyol (C9)

70.0 Parts by mass of 1,4-butanediol (manufactured by KANTO CHEMICAL CO., INC.) and 75.7 parts by mass of adipic acid (manufactured by KANTO CHEMICAL CO., INC.) were charged into a flask equipped with a stirrer, a nitrogen gas introducing tube, a Snyder fractionating column, and a condenser, and gradually heated so that the temperature of the upper portion of the Snyder fractionating column did not exceed 100° C. A mixture was stirred for 4 h while the temperature in the flask was controlled at 200° C., to terminate the reaction to obtain a polyester polyol (C9) having a hydroxyl value of 147 mg KOH/g and a theoretical number average molecular weight of 380 as calculated from the hydroxyl value.

(Solvent-Free Type Urethane Adhesives and Solvent Type Urethane Adhesives)

Example 1

21.0 Parts by mass of the polyester polyol (C1), 30.0 parts by mass of the glycol-modified aromatic hydrocarbon-formaldehyde resin (A1), and 49.0 parts by mass of PEP-XDI obtained in Production Example 5 (corresponding to 36.4 parts by mass of the xylylene diisocyanate (B1) and 12.6 parts by mass of the polyester polyol (C2)) were charged (NCO/OH$^T$=1.7) into a 100 mL container and hand-stirred at room temperature for 1 min using a spatula, to obtain a solvent-free type urethane adhesive.

Example 2

33.3 Parts by mass of the glycol-modified aromatic hydrocarbon-formaldehyde resin (A1) and 40.6 parts by mass of polypropylene glycol 1,000 (C3) (manufactured by KANTO CHEMICAL CO., INC., hydroxyl value: 96 mg KOH/g, number average molecular weight: 1,170) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 26.1 parts by mass of diphenylmethane diisocyanate (B2) (manufactured by TOKYO CHEMICAL INDUSTRY CO., LTD., NCO %=33.6%) was added (NCO/OH$^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Example 3

18.6 Parts by mass of the glycol-modified aromatic hydrocarbon-formaldehyde resin (A1) and 39.0 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 42.4 parts by mass of diphenylmethane diisocyanate (B2) (manufactured by TOKYO CHEMICAL INDUSTRY CO., LTD., NCO %=33.6%) was added (NCO/OH$^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Example 4

33.0 Parts by mass of the glycol-modified aromatic hydrocarbon-formaldehyde resin (A2) and 29.5 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 37.5 parts by mass of diphenylmethane diisocyanate (B2) (manufactured by TOKYO CHEMICAL INDUSTRY CO., LTD., NCO %=33.6%) was added (NCO/OH$^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 1

46.2 Parts by mass of the polyester polyol (C1) and 53.8 parts by mass of PEP-XDI obtained in Production Example 5 (corresponding to 40.0 parts by mass of the xylylene diisocyanate (B1) and 13.8 parts by mass of the polyester polyol (C2)) were charged (NCO/OH$^T$=1.7) into a 100 mL container and hand-stirred at room temperature for 1 min using a spatula, to obtain a solvent-free type urethane adhesive.

Comparative Example 2

19.7 Parts by mass of the polyester polyol (C1), 34.3 parts by mass of polypropylene glycol 1,000 (C3) (manufactured by KANTO CHEMICAL CO., INC., hydroxyl value: 96 mg KOH/g, number average molecular weight: 1,170), and 46.0 parts by mass of PEP-XDI obtained in Production Example 5 (corresponding to 34.2 parts by mass of the xylylene diisocyanate (B1) and 11.8 parts by mass of the polyester polyol (C2)) were charged (NCO/OH$^T$=1.7) into a 100 mL container and hand-stirred at room temperature for 1 min using a spatula, to obtain a solvent-free type urethane adhesive.

Comparative Example 3

51.9 Parts by mass of polyethylene glycol 600 (C4) (manufactured by KANTO CHEMICAL CO., INC., hydroxyl value: 190 mg KOH/g, number average molecular weight: 590) was charged into a flask equipped with a stirrer, a nitrogen gas introducing tube, a Snyder (fractionating) column, a condenser, and a vacuum pump, and subjected to a dehydration operation at 80° C. for 2 h while the pressure was reduced to 30 hPa. Subsequently, the polyethylene glycol 600 (C4) was cooled to 60° C., and then under a nitrogen atmosphere, 48.1 parts by mass of diphenylmethane diisocyanate (B2) (manufactured by TOKYO CHEMICAL INDUSTRY CO., LTD., NCO %=33.6%) was added (NCO/OH$^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 4

75.7 Parts by mass of polypropylene glycol 1,000 (C3) (manufactured by KANTO CHEMICAL CO., INC., hydroxyl value: 96 mg KOH/g, number average molecular weight: 1,170) was charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 24.3 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 5

70.5 Parts by mass of NIKANOL H (manufactured by Fudow Company Limited, xylene resin, hydroxyl value: 35 mg KOH/g, weight average molecular weight: 990) and 13.0 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 16.5 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 6

50.0 Parts by mass of NIKANOL K-100 (manufactured by Fudow Company Limited, trimethylolpropane-modified xylene resin, hydroxyl value: 81 mg KOH/g, weight average molecular weight: 720) and 22.5 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 27.5 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 7

77.6 Parts by mass of NIKANOL Y-50 (manufactured by Fudow Company Limited, xylene resin, hydroxyl value: 24 mg KOH/g, weight average molecular weight: 330) and 9.8 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 12.6 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 8

23.0 Parts by mass of NIKANOL K-140 (manufactured by Fudow Company Limited, trimethylolpropane-modified xylene resin, hydroxyl value: 280 mg KOH/g, weight average molecular weight: 960) and 33.9 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 43.1 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

Comparative Example 9

69.0 Parts by mass of NIKANOL L5 (manufactured by Fudow Company Limited, ethylene oxide-modified xylene resin, hydroxyl value: 38 mg KOH/g, weight average molecular weight: 1,200) and 13.6 parts by mass of polyethylene glycol 600 (C4) (manufactured by KANTO CHEMICAL CO., INC., hydroxyl value: 190 mg KOH/g, number average molecular weight: 590) were charged into a flask equipped with a stirrer, a nitrogen gas introducing tube, a Snyder fractionating column, a condenser, and a vacuum pump, and subjected to a dehydration operation at 80° C. for 2 h while the pressure was reduced to 30 hPa. Subsequently, the temperature in the flask was cooled to 60° C., and then under a nitrogen atmosphere, 17.4 parts by mass of diphenylmethane diisocyanate (B2) (manufactured by TOKYO CHEMICAL INDUSTRY CO., LTD., NCO %=33.6%) was added (NCO/$OH^T$=1.5), and reacted for 15 min while the temperature in the flask was controlled at 60° C. A reaction product was dissolved in 100 parts by mass of ethyl acetate (manufactured by KANTO CHEMICAL CO., INC.) to obtain a solvent type urethane adhesive.

(Aqueous Urethane Resins)

Example 5

40.0 Parts by mass of industrial purified water as a solvent, 18.3 parts by mass of the glycol-modified aromatic hydrocarbon-formaldehyde resin (A1), and 19.3 parts by mass of a polycarbonate diol (C5) (manufactured by Asahi Kasei Corporation, product name: DURANOL W8011, hydroxyl value: 111 mg KOH/g, average molecular weight: 1000) were charged into a container and stirred at 25° C. for 5 min using a disper. Subsequently, 22.4 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 10

40.0 Parts by mass of industrial purified water as a solvent and 38.0 parts by mass of a polycarbonate diol (C5) (manufactured by Asahi Kasei Corporation, product name: DURANOL W8011, hydroxyl value: 111 mg KOH/g, average molecular weight: 1000) were charged into a container and stirred at 25° C. for 5 min using a disper. Subsequently, 22.0 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 11

40.0 Parts by mass of industrial purified water as a solvent, 21.2 parts by mass of a polycarbonate diol (C5) (manufactured by Asahi Kasei Corporation, product name: DURANOL W8011, hydroxyl value: 111 mg KOH/g, average molecular weight: 1000), and 14.4 parts by mass of castor oil (C6) (manufactured by ITOH OIL CHEMICALS CO., LTD., product name: URIC H-30, hydroxyl value: 163 mg KOH/g, average molecular weight: 930) were charged into a container and stirred at 25° C. for 5 min using a disper. Subsequently, 24.5 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 12

40.0 Parts by mass of industrial purified water as a solvent, 19.2 parts by mass of a polycarbonate diol (C5) (manufactured by Asahi Kasei Corporation, product name: DURANOL W8011, hydroxyl value: 111 mg KOH/g, average molecular weight: 1000), and 18.6 parts by mass of a polycarbonate diol (C7) (manufactured by Asahi Kasei Corporation, product name: DURANOL 6001, hydroxyl value: 114 mg KOH/g, average molecular weight: 1000) were charged into a container and stirred at 25° C. for 5 min using a disper. Subsequently, 22.2 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 13

40.0 Parts by mass of industrial purified water as a solvent, 19.1 parts by mass of a polycarbonate diol (C5) (manufactured by Asahi Kasei Corporation, product name: DURANOL W8011, hydroxyl value: 111 mg KOH/g, average molecular weight: 1000), and 18.8 parts by mass of polytetramethylene ether glycol (C8) (manufactured by TOKYO CHEMICAL INDUSTRY CO., LTD., hydroxyl value: 112 mg KOH/g, average molecular weight: 1000) were charged into a container and stirred at 25° C. for 5 min using a disper. Subsequently, 22.1 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 14

40.0 Parts by mass of industrial purified water as a solvent, 20.6 parts by mass of a polycarbonate diol (C5) (manufactured by Asahi Kasei Corporation, product name: DURANOL W8011, hydroxyl value: 111 mg KOH/g, average molecular weight: 1000), and 15.5 parts by mass of the polyester polyol (C9) obtained in Production Example 6 were charged into a container and stirred at 25° C. for 5 min using a disper. Subsequently, 23.9 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

Comparative Example 15

40.0 Parts by mass of industrial purified water as a solvent, 9.3 parts by mass of NIKANOL K-140 (manufactured by Fudow Company Limited, trimethylolpropane-modified xylene resin, hydroxyl value: 280 mg KOH/g, weight average molecular weight: 960), and 23.5 parts by mass of a polycarbonate diol (C5) (manufactured by Asahi Kasei Corporation, product name: DURANOL W8011, hydroxyl value: 111 mg KOH/g, average molecular weight: 1000) were charged into a container and stirred at 25° C. for 5 min using a disper. Subsequently, 27.2 parts by mass of water-dispersible hexamethylene diisocyanate (B3) (manufactured by Asahi Kasei Corporation, product name: DURANATE WT31-100, NCO %=17.6%) (NCO/$OH^T$=1.23) was charged, and a mixture was reacted at 25° C. for 10 min while being stirred using a disper, to obtain an aqueous urethane resin.

<Evaluation of Adhesiveness of Urethane Resins>

Each of the solvent-free type urethane adhesives, the solvent type urethane adhesives, or the aqueous urethane resins obtained in the Examples and the Comparative Examples was applied to the corona-treated surface of a PET film having a thickness of 50 μm (manufactured by Toyobo Co., Ltd.) using a bar coater so as to have a thickness of 6 μm, and then heated at 80° C. for 10 s using a dryer. Then, an application surface and the corona-treated surface of a CPP film having a thickness of 50 μm (manufactured by Toyobo Co., Ltd.) were laminated to fabricate a laminated film having a PET film/adhesion layer/CPP film layer configuration. This laminated film was aged at 40° C. for 3 days for the curing of the adhesive to obtain a laminated film sample.

(Normal State Adhesive Strength)

For the obtained adhesion film sample, the adhesive strength between the layers of the PET film and the CPP film was measured by the method of the (3) adhesiveness test and taken as the normal state adhesive strength. The measurement results are summarized in Table 1 and Table 2.

(Evaluation of Adhesive Strength after Moisture Resistance Test and Moisture Resistance)

The obtained laminated film sample was subjected to high humidity aging under an atmosphere at 70° C. and 95% RH for 7 days using a constant temperature and humidity tester, and the adhesive strength between the layers of the PET film and CPP film of a removed laminated film sample was measured to obtain the adhesive strength after the moisture resistance test. The adhesive strength retention rate after the moisture resistance test (%) was calculated by the calculation formula [adhesive strength after moisture resistance test÷normal state adhesive strength×100]. The measurement results and the calculation results are summarized in Table 1 and Table 2.

(Evaluation of Adhesive Strength after Heat Aging Resistance Test and Heat Aging Resistance)

The obtained laminated film sample was subjected to high temperature aging at an ambient temperature of 120° C. for 7 days using a hot air dryer, and the adhesive strength between the layers of the PET film and CPP film of a removed laminated film sample was measured to obtain the adhesive strength after the heat aging resistance test. The adhesive strength retention rate after the heat aging resistance test (%) was calculated by the calculation formula [adhesive strength after heat aging resistance test÷normal state adhesive strength×100]. The measurement results and the calculation results are summarized in Table 1 and Table 2.

(Evaluation Criteria for Adhesiveness of Solvent-Free Type Urethane Adhesives and Solvent Type Urethane Adhesives)
(Moisture Resistance)

The moisture resistance when the adhesive strength retention rate after the moisture resistance test was 70% or more was evaluated as A, and the moisture resistance when the adhesive strength retention rate after the moisture resistance test was less than 70% was evaluated as B.

(Heat Aging Resistance)

The heat aging resistance when the adhesive strength retention rate after the heat aging resistance test was 70% or more was evaluated as A, and the heat aging resistance when the adhesive strength retention rate after the heat aging resistance test was less than 70% was evaluated as B.

When the normal state adhesive strength was 1 N/15 mm or less, the evaluation of moisture resistance and heat aging resistance was not performed.

(Evaluation Criteria for Adhesiveness of Aqueous Urethane Resins)

One in which the normal state adhesive strength was 8.0 N/15 mm or more, and the adhesive strength retention rate after the moisture resistance test and the adhesive strength retention rate after the heat aging resistance test were 50% or more was evaluated as A. One in which the normal state adhesive strength was less than 8.0 N/15 mm, or at least one of the adhesive strength retention rate after the moisture resistance test and the adhesive strength retention rate after the heat aging resistance test was less than 50% was evaluated as B.

The compositions of the urethane adhesives, the solvent-free type urethane adhesives and the solvent type urethane adhesives, and the evaluation results of the adhesive strength, moisture resistance, and heat aging resistance of the urethane adhesives are shown in Table 1.

The compositions and results of adhesive strength and adhesiveness evaluation of the aqueous urethane resins are shown in Table 2.

TABLE 1

| | | | Examples | | | | Comparative Examples | | |
|---|---|---|---|---|---|---|---|---|---|
| | | Unit | 1 | 2 | 3 | 4 | 1 | 2 | 3 |
| Glycol-modified aromatic hydrocarbon formaldehyde resin (A) | (A1) | % by mass | 30.0 | 33.3 | 18.6 | — | — | — | — |
| | (A2) | | — | — | — | 33.0 | — | — | — |
| Polyisocyanate (B) | (B1) | | 36.4 | — | — | — | 40.0 | 34.2 | — |
| | (B2) | | — | 26.1 | 42.4 | 37.5 | — | — | 48.1 |
| Polyol (C) | (C1) | | 21.0 | — | — | — | 46.2 | 19.7 | — |
| | (C2) | | 12.6 | — | — | — | 13.8 | 11.8 | — |
| | (C3) | | — | 40.6 | — | — | — | 34.3 | — |
| | (C4) | | — | — | 39.0 | 29.5 | — | — | 51.9 |
| Non-glycol-modified aromatic hydrocarbon formaldehyde resin | NIKANOL H | | — | — | — | — | — | — | — |
| | NIKANOL Y-50 | | — | — | — | — | — | — | — |
| | NIKANOL L5 | | — | — | — | — | — | — | — |
| | NIKANOL K-140 | | — | — | — | — | — | — | — |
| | NIKANOL K-100 | | — | — | — | — | — | — | — |
| NCO/OH Equivalent ratio | | | 1.7 | 1.5 | 1.5 | 1.5 | 1.7 | 1.7 | 1.5 |
| Adhesiveness evaluation | Normal state adhesive strength | N/15 mm | 12.0 | 12.5 | 15.2 | 11.8 | 13.7 | 11.1 | 9.6 |
| | Adhesive strength after moisture resistance test | N/15 mm | 9.6 | 14.1 | 12.9 | 9.2 | 9.0 | 5.3 | 0.8 |
| | Adhesive strength retention rate after moisture resistance test | % | 80 | 113 | 85 | 78 | 66 | 48 | 9 |
| | Moisture resistance | | A | A | A | A | B | B | B |
| | Adhesive strength after heat aging resistance test | N/15 mm | 11.5 | 13.5 | 12.0 | 8.5 | 13.0 | 6.6 | 2.8 |
| | Adhesive strength retention rate after | % | 96 | 108 | 79 | 72 | 95 | 59 | 29 |

TABLE 1-continued

|  |  | Unit | | | | | | | |
|---|---|---|---|---|---|---|---|---|---|
| heat aging resistance test |  |  |  |  |  |  |  |  |  |
| Heat aging resistance |  |  | A | A | A | A | A | B | B |

|  |  |  | Unit | Comparative Examples | | | | | |
|---|---|---|---|---|---|---|---|---|---|
|  |  |  |  | 4 | 5 | 6 | 7 | 8 | 9 |
| Glycol-modified aromatic hydrocarbon formaldehyde resin (A) | (A1) |  | % by mass | — | — | — | — | — | — |
|  | (A2) |  |  | — | — | — | — | — | — |
| Polyisocyanate (B) | (B1) |  |  | — | — | — | — | — | — |
|  | (B2) |  |  | 24.3 | 16.5 | 27.5 | 12.6 | 43.1 | 17.4 |
| Polyol (C) | (C1) |  |  | — | — | — | — | — | — |
|  | (C2) |  |  | — | — | — | — | — | — |
|  | (C3) |  |  | 75.7 | — | — | — | — | — |
|  | (C4) |  |  | — | 13.0 | 22.5 | 9.8 | 33.9 | 13.6 |
| Non-glycol-modified aromatic hydrocarbon formaldehyde resin | NIKANOL H |  |  | — | 70.5 | — | — | — | — |
|  | NIKANOL Y-50 |  |  | — | — | — | 77.6 | — | — |
|  | NIKANOL L5 |  |  | — | — | — | — | — | 69.0 |
|  | NIKANOL K-140 |  |  | — | — | — | — | 23.0 | — |
|  | NIKANOL K-100 |  |  | — | — | 50.0 | — | — | — |
| NCO/OH Equivalent ratio |  |  |  | 1.5 | 1.5 | 1.5 | 1.5 | 1.5 | 1.5 |
| Adhesiveness evaluation | Normal state adhesive strength |  | N/15 mm | 9.6 | 9.8 | 14.3 | 0.5 | 0.4 | 0.1 |
|  | Adhesive strength after moisture resistance test |  | N/15 mm | 0.3 | 4.2 | 12.3 | — | — | — |
|  | Adhesive strength retention rate after moisture resistance test |  | % | 3 | 43 | 86 | — | — | — |
|  | Moisture resistance |  |  | B | B | A | — | — | — |
|  | Adhesive strength after heat aging resistance test |  | N/15 mm | 0.5 | 4.6 | 2.6 | — | — | — |
|  | Adhesive strength retention rate after heat aging resistance test |  | % | 5 | 47 | 18 | — | — | — |
|  | Heat aging resistance |  |  | B | B | B | — | — | — |

TABLE 2

|  |  | Unit | Examples | Comparative Examples | | | | | |
|---|---|---|---|---|---|---|---|---|---|
|  |  |  | 5 | 10 | 11 | 12 | 13 | 14 | 15 |
| Glycol-modified aromatic hydrocarbon formaldehyde resin (A) | (A1) | % by mass | 18.3 | — | — | — | — | — | — |
| Polyisocyanate (B) | (B3) |  | 22.4 | 22.0 | 24.5 | 22.2 | 22.1 | 23.9 | 27.2 |
| Polyol (C) | (C5) |  | 19.3 | 38.0 | 21.2 | 19.2 | 19.1 | 20.6 | 23.5 |
|  | (C6) |  | — | — | 14.4 | — | — | — | — |
|  | (C7) |  | — | — | — | 18.6 | — | — | — |
|  | (C8) |  | — | — | — | — | 18.8 | — | — |
|  | (C9) |  | — | — | — | — | — | 15.5 | — |
| Non-glycol-modified aromatic hydrocarbon formaldehyde resin | NIKANOL K-140 |  | — | — | — | — | — | — | 9.3 |
| NCO/OH Equivalent ratio |  |  | 1.23 | 1.23 | 1.23 | 1.23 | 1.23 | 1.23 | 1.23 |
| Adhesiveness evaluation | Normal state adhesive strength | N/15 mm | 9.05 | 2.42 | 0.67 | 8.25 | 2.28 | 2.41 | 4.68 |
|  | Adhesive strength after moisture resistance test | N/15 mm | 4.93 | 1.37 | 0.85 | 2.44 | 1.46 | 1.38 | 3.44 |
|  | Adhesive strength retention rate after moisture resistance test | % | 54 | 57 | 127 | 30 | 64 | 57 | 74 |
|  | Adhesive strength after heat aging resistance test | N/15 mm | 8.61 | 2.41 | 1.1 | 4.03 | 0.47 | 3.06 | 4.01 |

TABLE 2-continued

|  | Unit | Examples 5 | Comparative Examples 10 | 11 | 12 | 13 | 14 | 15 |
|---|---|---|---|---|---|---|---|---|
| Adhesive strength retention rate after heat aging resistance test | % | 95 | 100 | 164 | 49 | 21 | 127 | 86 |
| Evaluation |  | A | B | B | B | B | B | B |

As a result of the evaluation of the solvent-free type urethane adhesives and the solvent type urethane adhesives, for all of the laminated film samples of Examples 1 to 4, the normal state adhesive strength was high, and further both the adhesive strength retention rate after the moisture resistance test and the adhesive strength retention rate after the heat aging resistance test were 70% or more, and good adhesiveness and moist heat resistance performance were exhibited.

On the other hand, for the laminated film samples using the resin compositions of Comparative Examples 1 to 4, although the normal state adhesive strength is good, the adhesive strength retention rate after the moisture resistance test or the heat aging resistance test is less than 70%, and both physical properties are not achieved.

For Comparative Examples 5 to 9, laminated film samples using urethane resins produced using non-glycol-modified aromatic hydrocarbon-formaldehyde resins are obtained. For Comparative Examples 5 and 6, although the normal state adhesive strength is good, the adhesive strength retention rate after the moisture resistance test or the heat aging resistance test is less than 70%, and both physical properties are not achieved. For Comparative Examples 7 to 9, the normal state adhesive strength was less than 1 N/15 mm, and it was found that Comparative Examples 7 to 9 were unsuitable for adhesive applications.

As a result of the evaluation of the aqueous urethane resins, for the laminated film sample of Example 5, the normal state adhesive strength was 8.0 N/15 mm or more, and the adhesive strength retention rate after the moisture resistance test and the adhesive strength retention rate after the heat aging resistance test were 50% or more, and good adhesiveness and moist heat resistance performance were exhibited.

On the other hand, for the laminated film samples of Comparative Examples 10 to 15, the normal state adhesive strength was less than 8.0 N/15 mm, or at least one of the adhesive strength retention rate after the moisture resistance test and the adhesive strength retention rate after the heat aging resistance test was less than 50%, and the results were poor compared with Example 5.

From the above results, it is clear that the urethane resins including the glycol-modified aromatic hydrocarbon-formaldehyde resin (A) are excellent in normal state adhesive strength and achieve the effect of suppressing a decrease in adhesive strength in exposure to a high temperature and humidity environment.

The invention claimed is:

1. A urethane resin produced by a process comprising:
reacting a glycol-modified aromatic hydrocarbon-formaldehyde resin (A) modified with a glycol with a polyisocyanate (B) having at least two free isocyanate groups in a molecule,
wherein the glycol-modified aromatic hydrocarbon-formaldehyde resin (A) has a hydroxyl value of from 50 to 250 mg KOH/g, and
wherein the glycol is at least one selected from the group consisting of neopentyl glycol, a spiroglycol, ethylene glycol, diethylene glycol, dipropylene glycol, 1,2-butanediol, 1,3-butanediol, 1,4-butanediol, 1,5-pentanediol, 1,6-hexanediol, 2,5-hexanediol, 1,2-hexanediol, 1,2-octanediol, 1,10-decanediol, 3-hexyne-2,5-diol, 2,5-dimethyl-3-hexyne-2,5-diol, 2,2,4-trimethyl-1,3-pentanediol, polyethylene glycol, and polyoxypropylene glycol.

2. The urethane resin according to claim 1, wherein the glycol-modified aromatic hydrocarbon-formaldehyde resin (A) is produced by a process comprising reacting 100 parts by mass of an aromatic hydrocarbon-formaldehyde resin with from 10 to 100 parts of the glycol.

3. The urethane resin according to claim 1, wherein the glycol-modified aromatic hydrocarbon-formaldehyde resin (A) has a weight average molecular weight of from 250 to 5,000 in terms of polystyrene.

4. The urethane resin according to claim 1, wherein the glycol-modified aromatic hydrocarbon-formaldehyde resin (A) is an ethylene glycol-modified xylene-formaldehyde resin.

5. The urethane resin according to claim 1, wherein the process comprises reacting the glycol-modified aromatic hydrocarbon-formaldehyde resin (A), the polyisocyanate (B), and further a polyol (C).

6. The urethane resin according to claim 5, wherein a molar ratio of isocyanate groups (NCO) of the polyisocyanate (B) to a total of hydroxy groups ($OH^T$) of the glycol-modified aromatic hydrocarbon-formaldehyde resin (A) and the polyol (C) ($NCO/OH^T$) is from 1.0 to 4.0.

7. The urethane resin according to claim 1, wherein the polyisocyanate (B) is a polyisocyanate comprising at least one aromatic group.

8. The urethane resin according to claim 1, wherein the polyisocyanate (B) is an aliphatic polyisocyanate comprising no aromatic group.

9. The urethane resin according to claim 1, wherein the glycol-modified aromatic hydrocarbon-formaldehyde resin (A) is present at a mass percentage of from 1 to 50% by mass relative to 100% by mass of a total of starting materials of the urethane resin.

10. The urethane resin according to claim 1, wherein the glycol-modified aromatic hydrocarbon-formaldehyde resin (A) is reacted with the polyisocyanate (B) in a water solvent.

11. An adhesive comprising the urethane resin of claim 1.

12. A paint comprising the urethane resin of claim 1.

13. The urethane resin according to claim 2, wherein the glycol-modified aromatic hydrocarbon-formaldehyde resin (A) has a weight average molecular weight of 250 to 5,000 in terms of polystyrene.

* * * * *